United States Patent [19]

Schlicker

[11] Patent Number: 4,483,687
[45] Date of Patent: Nov. 20, 1984

[54] VEHICLE GEARBOX WITH CONTINUOUSLY VARIABLE GEAR RATIO

[75] Inventor: Heinrich A. Schlicker, Stenungsund, Sweden

[73] Assignee: AB Volvo, Gothenburg, Sweden

[21] Appl. No.: 326,396

[22] Filed: Dec. 1, 1981

[30] Foreign Application Priority Data

Dec. 12, 1980 [SE] Sweden ............... 8008771

[51] Int. Cl.³ .............................. F16H 55/52
[52] U.S. Cl. ......................... 474/28; 474/18
[58] Field of Search ................. 474/28, 18, 72

[56] References Cited

U.S. PATENT DOCUMENTS

| | | | |
|---|---|---|---|
| 3,600,961 | 8/1971 | Rattunde | 474/28 |
| 4,152,947 | 5/1979 | van Deursen et al. | 474/11 |
| 4,292,031 | 9/1981 | Rattunde | 474/18 |
| 4,403,974 | 9/1983 | Shermann et al. | 474/18 |

FOREIGN PATENT DOCUMENTS 1094111 12/1960 Fed. Rep. of Germany ........ 474/28
1304112 8/1962 France .

Primary Examiner—Lawrence J. Staab
Assistant Examiner—Michael Bednarek
Attorney, Agent, or Firm—Young & Thompson

[57] ABSTRACT

Gear box, especially for motor vehicles, with a driving and a driven shaft, which carry pulleys, between which pulleys torque is transmitted by means of a V-belt or chain. The pulleys consist of discs movable towards and away from each other, to make variation possible of the speed ratio between the shafts. The movement of the discs and the clamping force against the V-belt is controlled with the aid of hydraulic cylinder devices. The hydraulic cylinder of the driving shaft is joined to a gear which is arranged concentrically with the cylinder and which engages a gear on the input shaft of the gear box.

5 Claims, 1 Drawing Figure

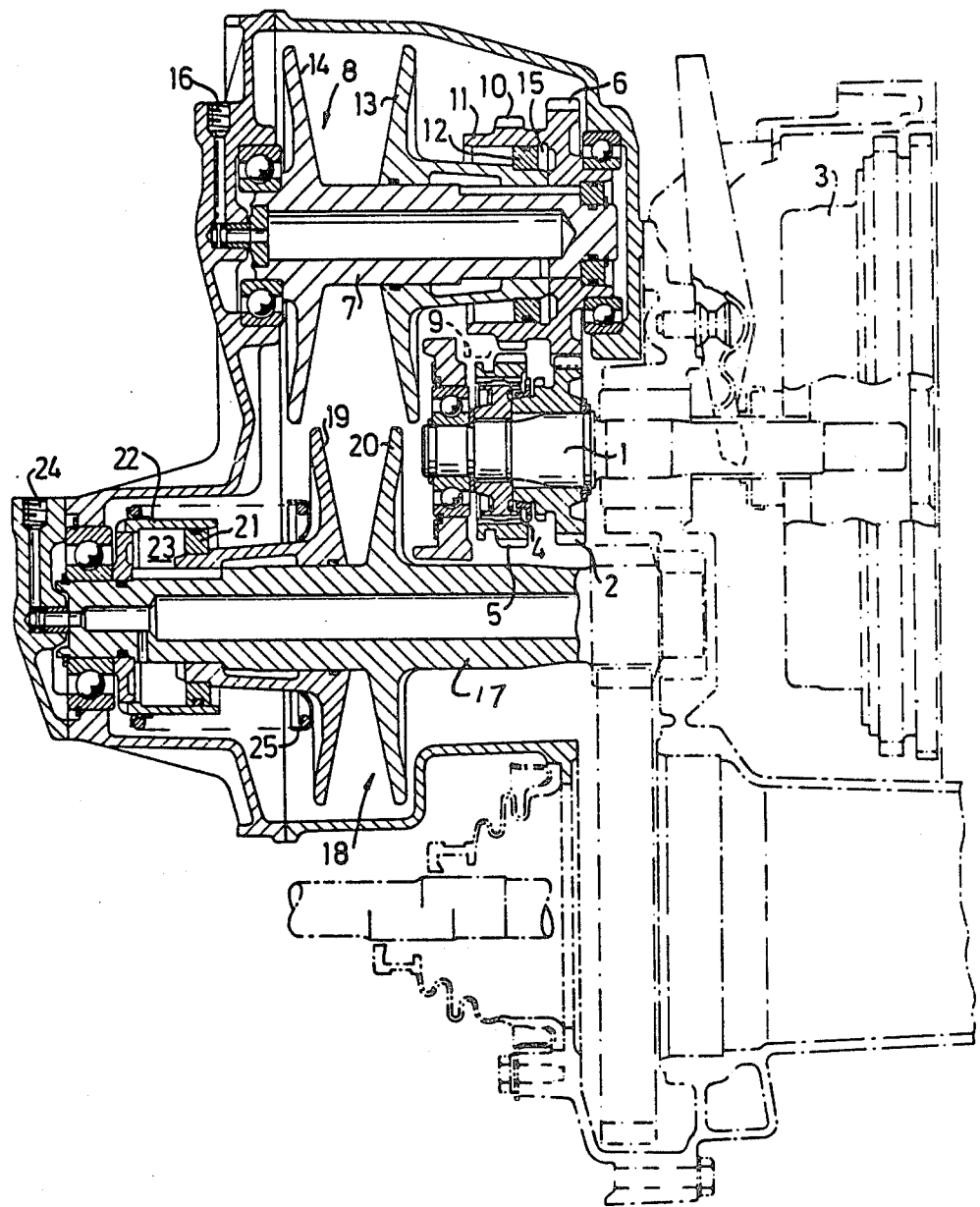

VEHICLE GEARBOX WITH CONTINUOUSLY VARIABLE GEAR RATIO

The present invention relates to a gearbox especially for motor vehicles which carries belt pulleys on a driving and a driven shaft respectively, between which pulleys torque is transmitted by means of an endless flexible member, e.g. a V-belt or metal chain, and which consists of a pair of pulley members with variable spacing between them on the respective shaft to vary the effective radii of the belt pulleys and thus the transmission ratio between the driving and the driven shaft, said driving shaft having a fluid cylinder arranged concentrically with and joined to said shaft, and containing a slidable plunger joined to one pulley member.

Hydraulically controlled gear boxes of this type, so called continuously variable transmissions, have of late been developed for use in motor vehicles. Compared with the usual type of continuously variable transmissions for motor vehicles, the speed ratio of which is controlled by vacuum members and centrifugal regulators, hydraulic control achieves both on the one hand more exact control of the speed ratio and the clamping force of the pulley members, and on the other hand the possibility of making the gear box more compact, thus saving space.

The purpose of the present invention is to achieve an optimally compact gear box of the type described in the introduction, which is particularly suited for connection to a transverse engine.

This is achieved according to the invention by the cylinder being joined to a gear arranged concentrically with the cylinder and engaging a gear on the input shaft of the gear box.

In the gear box according to the invention, the torque from the input shaft is transmitted to the shaft of the pulley via the hydraulic cylinder, which means that the length of the shaft can be dimensioned without taking into account the gear. The result is an optimally short gear box, which is especially useful in transverse engines, where the lateral engine space is quite limited. A saving in weight is also achieved.

In an improved embodiment of the gear box according to the invention, the reverse gear is also arranged concentrically with the cylinder, with both gears being made in one piece with the cylinder. Machining the teeth of the gears directly in the cylinder material provides both an economical manufacturing process and simple assembly by virtue of the fact that three parts can be molded as one unit.

The invention will be described in more detail below with reference to the embodiment shown in the accompanying drawing, which shows a longitudinal section through a gear box according to the invention.

In the FIGURE, 1 designates an input shaft, on which a gear 2 is rotatably journalled. 3 designates a clutch device. The gear 2 can be locked on the shaft 1 by means of a claw coupling 4, which is coordinated with a reverse gear 5. The gear 2 engages a gear 6 on a shaft 7 which carries a pulley 8. The FIGURE shows the gears in the neutral position. When the coupling 4 with the gear 5 is moved to the right in the FIGURE, the gear 2 is locked on the input shaft 1 and forward drive is thus engaged. The reverse gear is engaged by an intermediate gear 9 (indicated with dash-lines) being brought into engagement with the reversing gear 5 and a gear 10 joined to the shaft 7.

The gears 6, 10 are made in one piece with a cylindrical member 11, which acts as a hydraulic cylinder for a plunger 12, which is securely fixed to the one 13 of the two discs 13 and 14 of the pulley 8, which is displaceable on the shaft 7. The cylinder chamber 15 behind the plunger 12 communicates with a pressure source via a connection 16. By having the outside of the hydraulic cylinder 11 form the gears 6 and 10, especially compact design is achieved.

An output shaft 17 is provided in a corresponding manner with a pulley 18, which consists of two discs 19 and 20, of which the disc 19 is joined to a piston 21, which is slidable in a cylinder 22, the cylinder chamber 23 of which communicates with a pressure source via a connection 24. The disc 19 is biased towards the disc 20 by a spring 25.

What I claim is:

1. Gearbox, especially for motor vehicles, which has an input shaft and carries belt pulleys on a driving and a driven shaft respectively, between which pulleys torque is transmitted by means of an endless, flexible member, and which pulleys consist of a pair of pulley members on each said shaft with variable spacing between to vary the transmission ratio between the driving and the driven shaft, said driving shaft having a fluid cylinder arranged concentrically with and joined to said shaft, and containing a slidable plunger joined to one pulley member, characterized in that the cylinder is joined to a gear arranged concentrically with the cylinder and engaging a gear on the input shaft of the gearbox.

2. Gearbox according to claim 1, characterized in that the cylinder is joined to a second gear arranged concentrically with said cylinder and forming a reverse gear for engagement with an intermediate gear.

3. Gearbox according to claim 2, characterized in that at least one of the gears is arranged on the lateral surface of the cylinder.

4. Gearbox according to claim 2, characterized in that one of the gears forms a closed end of the cylinder.

5. Gearbox according to one of claims 2–4, characterized in that the cylinder and at least one of said gears are made together as a single part.

* * * * *